US007230066B2

(12) United States Patent
Khouri et al.

(10) Patent No.: US 7,230,066 B2
(45) Date of Patent: Jun. 12, 2007

(54) POLYCARBONATE—ULTEM BLOCK COPOLYMERS

(75) Inventors: Farid Khouri, Clifton Park, NY (US); Julia Lee, Niskayuna, NY (US); Sheldon Shafer, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/015,216

(22) Filed: Dec. 16, 2004

(65) Prior Publication Data

US 2006/0135733 A1 Jun. 22, 2006

(51) Int. Cl.
C08G 63/02 (2006.01)
(52) U.S. Cl. ............... 528/272; 525/433; 525/439; 525/468; 528/170; 528/271
(58) Field of Classification Search .......... 525/433, 525/439, 468; 528/170, 271, 272
See application file for complete search history.

(56) References Cited

U.S. PATENT DOCUMENTS

| | | | |
|---|---|---|---|
| 2,465,319 A | 3/1949 | Whinfield et al. | |
| 2,901,466 A | 8/1959 | Kibler et al. | |
| 3,019,272 A | 1/1962 | Griffing et al. | |
| 3,030,335 A | 4/1962 | Goldberg | |
| 3,047,539 A | 7/1962 | Pengilly | |
| 3,546,008 A | 12/1970 | Shields et al. | |
| 3,803,085 A | 4/1974 | Takehoshi et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,884,882 A | 5/1975 | Caywood, Jr. | |
| 3,905,942 A | 9/1975 | Takekoshi et al. | |
| 3,946,090 A | 3/1976 | Margotte et al. | |
| 3,972,902 A | 8/1976 | Heath et al. | |
| 3,983,093 A | 9/1976 | Williams, III et al. | |
| 4,097,446 A | 6/1978 | Abolins et al. | |
| 4,141,927 A | 2/1979 | White et al. | |
| 4,147,740 A | 4/1979 | Swiger et al. | |
| 4,174,358 A | 11/1979 | Epstein | |
| 4,217,437 A | 8/1980 | Schreckenberg et al. | |
| 4,225,687 A | 9/1980 | deTorres | |
| 4,250,279 A | 2/1981 | Robeson et al. | |
| 4,251,644 A | 2/1981 | Joffrion | |
| 4,252,922 A | 2/1981 | Adelmann et al. | |
| 4,259,458 A | 3/1981 | Robeson | |
| 4,315,086 A | 2/1982 | Ueno et al. | |
| 4,323,668 A | 4/1982 | Brunelle | |
| 4,346,194 A | 8/1982 | Roura | |
| 4,387,193 A | 6/1983 | Giles, Jr. | |
| 4,430,484 A | 2/1984 | Quinn | |
| 4,436,839 A | 3/1984 | Behnke et al. | |
| 4,443,591 A | 4/1984 | Schmidt et al. | |
| 4,455,410 A | 6/1984 | Giles, Jr. | |
| 4,474,927 A | 10/1984 | Novak | |
| 4,539,370 A | 9/1985 | Nouvertne et al. | |
| 4,548,997 A | 10/1985 | Mellinger et al. | |
| 4,611,048 A * | 9/1986 | Peters | 528/185 |
| 4,657,977 A * | 4/1987 | Peters | 525/92 A |
| 4,659,760 A | 4/1987 | van der Meer | |
| 4,673,708 A | 6/1987 | Rock et al. | |
| 4,732,938 A | 3/1988 | Grant et al. | |
| 4,755,566 A | 7/1988 | Yates, III | |
| 4,760,117 A | 7/1988 | Evans et al. | |
| 4,877,848 A | 10/1989 | Maresca | |
| 4,908,277 A | 3/1990 | Tsunashima et al. | |
| 4,916,194 A * | 4/1990 | Policastro et al. | 525/433 |
| 4,957,980 A | 9/1990 | Kobayashi et al. | |
| 5,037,900 A | 8/1991 | Yoshino et al. | |
| 5,091,591 A | 2/1992 | Cipullo | |
| 5,151,491 A | 9/1992 | Sakashita et al. | |
| 5,229,482 A | 7/1993 | Brunelle | |
| 5,248,732 A * | 9/1993 | Drzewinski | 525/133 |
| 5,276,129 A | 1/1994 | Sakashita et al. | |
| 5,300,332 A | 4/1994 | Kawaguchi et al. | |
| 5,300,572 A | 4/1994 | Tajima et al. | |
| 5,525,701 A | 6/1996 | Tominari et al. | |
| 5,696,222 A * | 12/1997 | Kaneko et al. | 528/196 |
| 5,756,643 A | 5/1998 | Ho et al. | |
| 6,177,536 B1 | 1/2001 | Anamizu et al. | |
| 6,235,866 B1 | 5/2001 | Khouri et al. | |
| 6,252,036 B1 | 6/2001 | Hatono et al. | |
| 6,284,830 B1 * | 9/2001 | Gottschalk et al. | 524/449 |
| 6,300,459 B1 | 10/2001 | Kaneko et al. | |
| 6,303,734 B1 | 10/2001 | Funakoshi et al. | |
| 6,399,739 B1 | 6/2002 | McCloskey et al. | |

(Continued)

FOREIGN PATENT DOCUMENTS

EP 0383977 8/1990

(Continued)

Primary Examiner—Terressa Boykin
(74) Attorney, Agent, or Firm—Marina Larson & Associates, LLC

(57) ABSTRACT

The present invention provides novel block copolycarbonates comprising residues from a hydroxy terminated polyetherimide or polyimide, residues from a dihydroxy compound, and residues from an activated carbonate. In a preferred embodiment of the present invention the polyetherimide or polyimide blocks exhibit high $M_w$, while the resulting block copolycarbonate exhibits a single $T_g$. The novel block copolycarbonates of the present invention are produced under melt polymerization conditions in the presence an activated carbonate source.

24 Claims, No Drawings

U.S. PATENT DOCUMENTS

| | | |
|---|---|---|
| 6,403,754 B1 | 6/2002 | McCloskey et al. |
| 6,410,777 B1 | 6/2002 | Kaneko et al. |
| 6,417,291 B1 | 7/2002 | Kaneko et al. |
| 6,420,512 B1 | 7/2002 | McCloskey et al. |
| 6,420,588 B1 | 7/2002 | McCloskey et al. |
| 6,469,192 B1 | 10/2002 | Burnell et al. |
| 6,500,914 B1 | 12/2002 | Brack et al. |
| 6,506,871 B1 | 1/2003 | Silvi et al. |
| 6,518,391 B1 | 2/2003 | McCloskey et al. |
| 6,525,163 B1 | 2/2003 | Brack et al. |
| 6,548,623 B2 | 4/2003 | Brunelle et al. |
| 6,590,068 B2 | 7/2003 | Brack et al. |
| 6,600,004 B1 | 7/2003 | McCloskey et al. |
| 6,653,434 B2 | 11/2003 | Brack et al. |
| 6,706,846 B2 | 3/2004 | Brack et al. |
| 6,710,156 B2 | 3/2004 | Whitney et al. |
| 6,723,823 B2 | 4/2004 | McCloskey et al. |
| 6,734,277 B2 | 5/2004 | Brack et al. |
| 6,747,119 B2 | 6/2004 | Brack et al. |
| 2002/0132957 A1 | 9/2002 | Brack et al. |
| 2004/0068086 A1 | 4/2004 | Day et al. |
| 2004/0087756 A1 | 5/2004 | Ramesh et al. |

FOREIGN PATENT DOCUMENTS

| | | |
|---|---|---|
| JP | 5009282 A2 | 1/1993 |
| JP | 63-6271 | 11/1994 |
| JP | 10-101786 A2 | 4/1998 |
| JP | 10-101787 A2 | 4/1998 |
| JP | 4-77550 | 5/1999 |
| JP | 11-302228 | 11/1999 |
| JP | 2002-309015 A2 | 10/2002 |
| WO | WO 03/040208 A1 | 5/2003 |
| WO | WO 03/106149 A1 | 12/2003 |

* cited by examiner

POLYCARBONATE—ULTEM BLOCK COPOLYMERS

BACKGROUND OF THE INVENTION

Block copolymers of polycarbonates including segments of other polymers have been known, see for example, Goldberg, U.S. Pat. No. 3,030,335, Adelmann, et al., U.S. Pat. No. 4,252,922, and Behnke et al., U.S. Pat. No. 4,436,839 which disclose block copolymers of bisphenol-A carbonates including segments derived from polyalkylene glycols. In Schreckenberg et al., U.S. Pat. No. 4,217,437, the polyalkylene glycols are advantageously end-functionalized, e.g., with diphenol carbonates. Such block copolymers are useful per se as film formers and shaped articles because of toughness conferred on the polycarbonates by the segments of other polymers. The block copolymers can also be blended with polycarbonate resins, and a whole host of other thermoplastic addition and condensation polymers to provide thermoplastic addition and condensation polymers to provide thermoplastic molding compositions showing markedly improved resilience properties compared with the unblended resins.

A highly useful family of heat resistant thermoplastic polymers is comprised of polyetherimide resins made by reacting a bis ether anhydride and an aromatic diamine. See, for example, Heath and Wirth, U.S. Pat. No. 3,847,867, who discloses the reaction product of 2,2-bis[4-2,3-dicarboxyphenoxy phenyl]propane dianhydride (BPA-DA) and metaphenylene diamine. The linear polymer is terminated with amino groups, and has a very high molecular weight and high melting point ($T_g$, typically=216° C.). Such a material cannot be readily blended with aromatic polycarbonate, because mixtures with two $T_g$'s are obtained, one for the polyetherimide resin, and one for the polycarbonate. Furthermore, because of the amino terminal groups, polyetherimides cannot be successfully used as blocks in copolymers with aromatic polycarbonate segments, as is done with polyethers.

U.S. Pat. No. 4,611,048 discloses a method for preparing low molecular weight polyetherimides which are end functionalized with hydroxyl groups. When such polyetherimides are reacted with a polyhydric phenol and a carbonate precursor, there is surprisingly obtained a block copolymer which exhibits only one glass transition temperature $T_g$. Such low molecular weight polyetherimide copolymers also exhibit a high intrinsic viscosity, making them useful as engineering thermoplastics, and they are surprisingly compatible with other resins making available a number of new molding compositions.

An interfacial process for making the aforementioned low molecular weight polyetherimide block copolycarbonate was disclosed in U.S. Pat. No. 4,657,977. This process disclosed the formulation and isolation of the polyetherimide oligomer prior to its copolymerization with polycarbonate. Several disadvantages are associated with this method including the excessive number of steps required to produce the block copolycarbonate as well as the excessive number of pieces of process equipment required to produce the same. Further, the interfacial process of making the block copolycarbonate is believed to cause uneven distribution of the blocks within the copolymer due to slow reaction rates and or different reactivities of the dihydroxy and the polyetherimide oligomer. Such uneven distribution required that the polyetherimide blocks be kept at a low molecular weight to promote randomness of the blocks within the copolycarbonate and to promote a single $T_g$ or a one phase system of the resulting copolycarbonate. It would be advantageous to find a process that provided a copolycarbonate wherein the copolycarbonate had polyetherimide blocks with high molecular weight while maintaining a single phase for the resulting copolycarbonate.

SUMMARY OF THE INVENTION

The present invention solves the problems of the prior art by providing a new process for the production of polyetherimide and polyimide block copolycarbonates. It has been found that high molecular weight polyetherimide and polyimide block copolycarbonates may be prepared that exhibit a single $T_g$. Further it has been found that the method of the present invention may be performed without the isolation of the polyetherimide or polyimide oligomer by using an activated diaryl carbonate in a melt polymerization. The invention further provides novel polyetherimide and polyimide block copolycarbonates wherein the polyetherimide or polyimide block comprises an average $M_n$ of greater than 7,000.

In one embodiment, the present invention provides a method of preparing a block copolymer wherein the method comprises the steps of:

(i) forming a first reaction mixture comprising a hydroxy terminated polyetherimide oligomer block or a polyimide oligomer block, (ii) adding to the first reaction mixture an activated carbonate and a dihydroxy composition, thereby forming a second reaction mixture, and (iii) allowing the second reaction mixture to react, thereby forming a block copolycarbonate.

It is a further aspect of the present invention to provide polyetherimide block copolycarbonate, which can be prepared by the method above and wherein the block copolymer comprises:

(i) residues from a hydroxy terminated polyetherimide or polyimide, (ii) residues from a dihydroxy compound different than (i), and (iii) residues from an activated carbonate.

In yet a further embodiment, the present invention provides a block copolymer that may be produced by the method above and wherein the block copolymer comprises blocks of:

(i) polyetherimide or polyimide, the block having an average $M_n$ of at least 7,000, and (ii) polycarbonate, wherein the weight ratio of blocks (i) to the block copolymer is between 0.10 and 0.90.

The present invention provides for novel block copolymers useful in many applications including forming compatibilized blends of polyetherimide or polyimide and polycarbonate.

DETAILED DESCRIPTION OF THE INVENTION

The present invention solves the problems of the prior art by providing a novel process for the production of polyetherimide and polyimide block copolycarbonates. It has herein been found that polyetherimide and polyimide block copolycarbonates may be advantageously prepared without the isolation of the polyetherimide or polyimide oligomer by using an activated diaryl carbonate as the carbonate source in a melt polymerization process. It has also been found that the method of the present invention provides high molecular weight polyimide and polyetherimide blocks in block copolycarbonates that exhibit single values of $T_g$.

The present invention may be understood more readily by reference to the following detailed description of preferred embodiments of the invention and the examples included therein. In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may-or may not occur, and that the description includes instances where the event occurs and instances where it does not.

As used herein, the term "solvent" can refer to a single solvent or a mixture of solvents.

As used herein, the term "melt polycarbonate" refers to a polycarbonate made by the transesterification of a diaryl carbonate with a dihydroxy compound.

"BPA" is herein defined as bisphenol A or 2,2-bis(4-hydroxyphenyl)propane.

"Polycarbonate" refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"Polycarbonate blocks" refer to polycarbonate linkages between the polyetherimide blocks within the copolymer. These polycarbonate blocks are generally of the statistical nature and may range from one to several hundred carbonate units in length within any given copolycarbonate of the present invention.

"Compatibilized blend" of polycarbonate and polyetherimide or polyimide means that the blend exhibits a single $T_g$.

The term $M_n$ is understood as the number average molecular weight and is measured in g/mol.

Numerical values in the specification and claims of this application reflect average values. Furthermore, the numerical values should be understood to include numerical values which are the same when reduced to the same number of significant figures and numerical values which differ from the stated value by less than the experimental error of the measurement technique used in the present application to determine the value.

$T_g$ refers to the glass transition temperature.

An embodiment of the invention provides a block copolymer wherein the block copolymer comprises blocks of:

(i) polyetherimide or polyimide, the block having an average $M_n$ of at least 7,000, and (ii) polycarbonate, wherein the weight ratio of blocks (i) to the block copolymer is between 0.10 and 0.90.

The hydroxy-terminated polyetherimide blocks used to prepare the polyetherimide block copolycarbonates of this invention are typically of the formula:

wherein n is an integer of at least 12; and —O-T group is selected from the group consisting of:

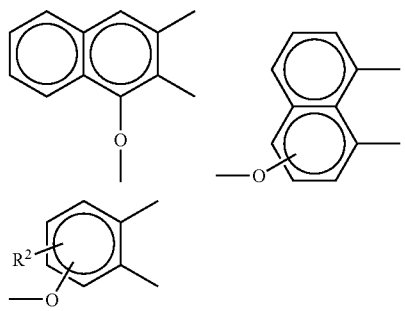

$R^2$ being hydrogen, lower alkyl or lower alkoxy; and Z is a member of the group consisting of:

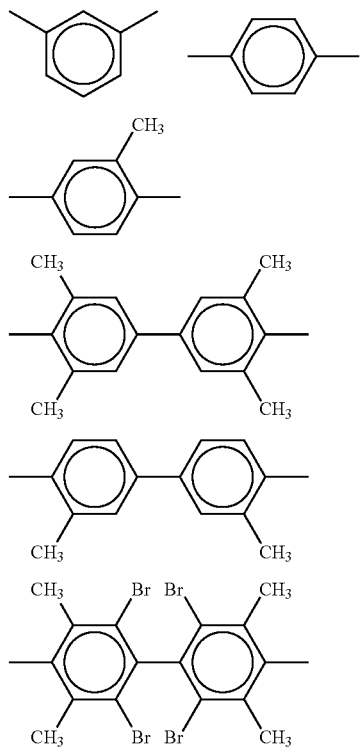

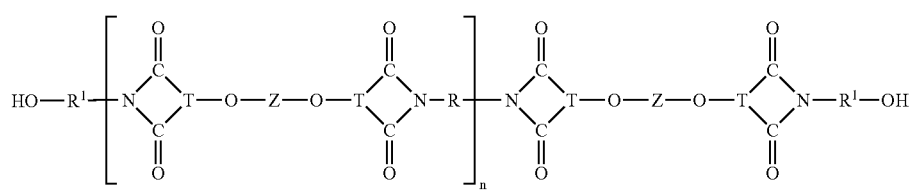

-continued

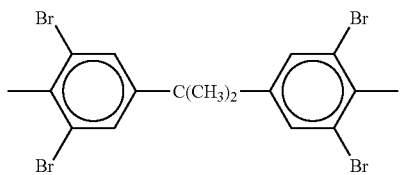

and divalent organic radicals of the general formula:

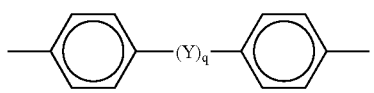

where Y is a member selected from the group consisting of divalent radicals of the formulae:

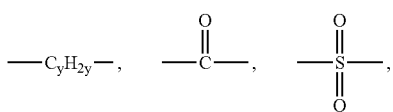

where q is 0 or 1, and y is a whole number from 1 to 5; and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula:

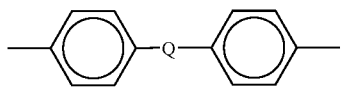

where Q is a member selected from the group consisting of:

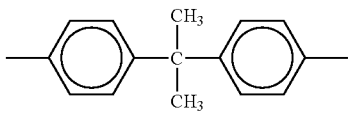

where x is a whole number from 1 to 5 inclusive; and $R^1$ is as defined for R above.

In preferred features, the hydroxy terminated polyetherimide oligomer will be of the formula:

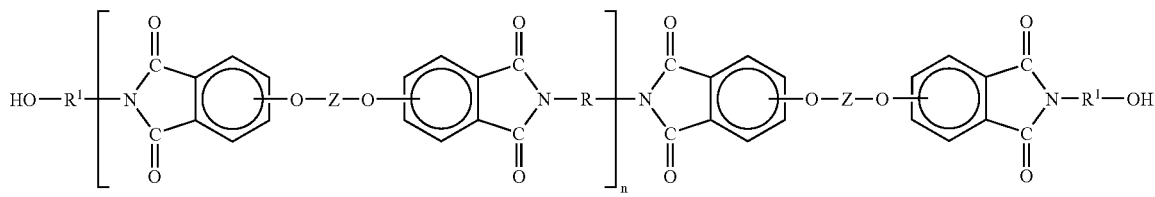

and especially those in which the divalent bonds of the —O-Z-O— radical are in the 3,3';3,4'; 4,3' or the 4,4' position. Also prepared are oligomers as above defined wherein Z is

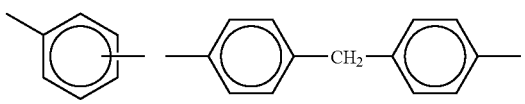

a preferred oligomer will be as above defined in the first formula wherein R and $R^1$ are independently selected from:

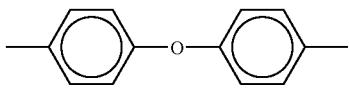

Special mention is made of oligomers wherein R is

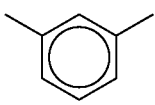

and $R^1$ is

In one embodiment the numerical value of n is greater than 12, wherein a n value of greater than 12 corresponds to an average $M_n$ value of greater than 7,000 for the polyetherimide block.

The polycarbonate blocks as described in the present invention are not particularly limited. These blocks are of statistical distribution meaning that they may be anywhere from one unit to several hundred units in length. Further, these blocks may be derived from one or more dihydroxy compositions different from the polyetherimide block composition, wherein the different dihydroxy compositions are statistically distributed throughout the block. Particularly preferred block copolymers of the present invention include block copolymers wherein the polycarbonate blocks are of the general formula:

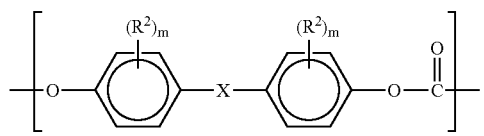

where X is selected from the group consisting of a bond, $C_1$–$C_8$ alkylene, $C_2$–$C_8$ alkylidene, $C_5$–$C_{15}$ cycloalkylene, $C_5$–$C_{15}$ cycloalkylidene, $SO_2$, SO, O, CO and

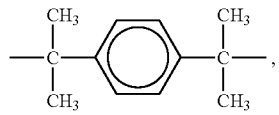

for example, wherein X is 2,2 isopropylidene. $R^2$ denotes a hydrogen atom, a halogen atom, a nitro group, a cyano group, $C_1$–$C_{20}$ alkyl radical, $C_4$–$C_{20}$ cycloalkyl radical, or $C_4$–$C_{20}$ aryl radical, m is an integer from 0 to 4. Preferably, $R^2$ is either a hydrogen atom or methyl group in the 3' or 5' position and m is 2.

In another preferred embodiment the polycarbonate blocks are of the general formula:

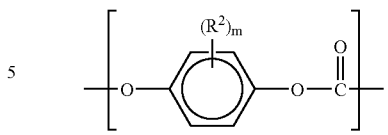

wherein $R^2$ denotes a hydrogen atom, a halogen atom, a nitro group, a cyano group, $C_1$–$C_{20}$ alkyl radical, $C_4$–$C_{20}$ cycloalkyl radical, or $C_4$–$C_{20}$ aryl radical, m is an integer from 0 to 4. The polycarbonate blocks may be derived from the group consisting of hydroquinone, resorcinol, methylhydroquinone, butylhydroquinone, phenylhydroquinone, 4-phenylresorcinol and 4-methylresorcinol.

The polycarbonate blocks as described in the present invention are typically derived from dihydroxy compositions. The dihydroxy compositions are not limited to aromatic dihydroxy compounds. However, such dihydroxy aromatic compounds are frequently preferred for use in these types of applications. It is contemplated that the dihydroxy compound comprises aliphatic diols and/or acids. The following is a non limiting list of such compounds:

Aliphatic Diols:
Isosorbide: 1,4:3,6-dianhydro-D-sorbitol, Tricyclodecane-dimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:
1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

It is further contemplated that the dihydroxy composition comprise a dihydroxy aromatic compound. A preferred dihydroxy aromatic composition of the present invention is bisphenol A (BPA). However, other dihydroxy aromatic compounds of the present invention can be used and are selected from the group consisting of bisphenols having structure,

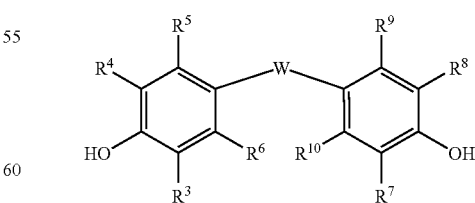

wherein $R^3$–$R^{10}$ are independently a hydrogen atom, halogen atom, nitro group, cyano group, $C_1$–$C_{20}$ alkyl radical, $C_4$–$C_{20}$ cycloalkyl radical, or $C_6$–$C_{20}$ C aryl radical; W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

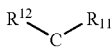

wherein $R^{11}$ and $R^{12}$ are independently a hydrogen atom, $C_1$–$C_{20}$ alkyl radical, $C_4$–$C_{20}$ cycloalkyl radical, or $C_4$–$C_{20}$ aryl radical; or $R^{11}$ and $R^{12}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups, or a combination thereof; dihydroxy benzenes having structure

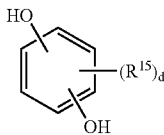

wherein $R^{15}$ is independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical, d is an integer from 0 to 4; and dihydroxy naphthalenes having structures,

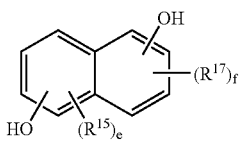

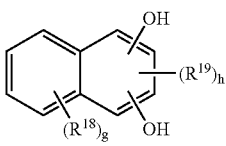

wherein $R^{16}$, $R^{17}$, $R^{18}$ and $R^{19}$ are independently at each occurrence a hydrogen atom, halogen atom, nitro group, cyano group, $C_1$–$C_{20}$ alkyl radical, $C_4$–$C_{20}$ cycloalkyl radical, or $C_4$–$C_{20}$ aryl radical; e and f are integers from 0 to 3, g is an integer from 0 to 4, and h is an integer from 0 to 2.

Suitable bisphenols are illustrated by 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)-propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(3,5-dimethyl-4-hydroxyphenyl)cyclohexane; 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5- trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, and 1,4-bis(2-(4-hydroxy-3-methylphenyl)-2-propyl)benzene.

Suitable dihydroxy benzenes are illustrated by hydroquinone, resorcinol, methylhydroquinone, butylhydroquinone, phenylhydroquinone, 4-phenylresorcinol and 4-methylresorcinol.

Suitable dihydroxy naphthalenes are illustrated by 2,6-dihydroxy naphthalene; 2,6-dihydroxy-3-methyl naphthalene; and 2,6-dihydroxy-3-phenyl naphthalene.

Suitable dihydroxy naphthalenes are illustrated by 1,4-dihydroxy naphthalene; 1,4-dihydroxy-2-methyl naphthalene; 1,4-dihydroxy-2-phenyl naphthalene and 1,3-dihydroxy naphthalene.

The relative amounts and selection of dihydroxy compositions used in accordance with the present invention are selected based on the desired composition and characteristics of the resulting polyetherimide block copolymer.

The block copolycarbonate of the present invention incorporates the polyetherimide or polyimide blocks into the copolycarbonate at a weight ratio of the polyetherimide or polyimide blocks to the block copolymer between 0.10 and 0.90 and more preferably at a weight ratio of between 0.20 and 0.80.

In a particularly preferred embodiment of the present invention the block copolycarbonate has a single $T_g$. The $T_g$ is preferably at least 130° C. and more preferably at least 150° C.

The block copolycarbonate of the present invention has particularly been found useful as a compatibilizer in blends of polycarbonate and polyetherimide or polyimide. These compositions can be prepared in conventional mixing units, such as kneaders and screw extruders, or by mixing solutions of the components and then isolating the composition via a devolatilization extruder.

When used herein and in the appended claims, "compatible" refers to blends or compositions of polymers in which the component polymers avoid stratification of the components during or after processing. Compatibility is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase boundaries, usually causes immiscible/incompatible blend systems to have poor mechanical properties, thus preventing the preparation of useful polymer blends. When blends of two polymers exhibit a single glass transition temperature ($T_g$), it generally signifies the resin components are compatible. However, a single $T_g$ is not a necessary condition for a compatible blend.

Once formed, the product composition may be employed (or further processed) in any conventional manner. Its applications include, for example, tough films useful in packaging. They may also be injection molded or extruded to produce a variety of useful thermoplastic articles.

In addition to at least two polymeric components, the present compositions may contain any of the conventional additives, for the purposes for which they are known. These additives include fire-retardants, impact modifiers, pigments, tints, reinforcing materials such as glass fiber, antioxidants and the like. They may be combined with the compositions either before or after melt mixing.

The invention further provides a novel method for making block copolycarbonates. Polyetherimide or polyimide block copolymers, wherein the polyimide or polyetherimide block has an average $M_n$ greater than 7,000, are preferably prepared by the method of the present invention. However, the method of the present invention is not limited to producing the block polymers wherein the polyetherimide or polyimide blocks have an average $M_n$ greater than 7,000. The interfacial processes including that is disclosed in U.S. Pat. No. 4,657,977, which is herein incorporated by reference, discloses a method for making polyetherimide block copolycarbonates generally including the step of isolating the polyetherimide oligomers prior to interfacial copolymerization with polycarbonate in the presence of phosgene. Once the polyetherimide is isolated it is then copolymerized with a polycarbonate. It has herein been found that the step of isolating the polyetherimide block prior to copolymerization with a dihydroxy composition is no longer required. By melt copolymerizing the polyetherimide or polyimide block with a dihydroxy composition different from the polyetherimide or polyimide block in the presence of an activated diaryl carbonate as the carbonate source, the linking reaction rate between the polyetherimide or polyimide blocks and polycarbonate blocks is greatly increased. By reacting the polyetherimide or polyimide block with a dihydroxy composition in the presence of an activated carbonate, the present invention has the benefit of reducing the time required for reaction and increasing the randomness of distribution of the blocks within the block copolycarbonate. This has the effect of providing a more even distribution of polyetherimide or polyimide and polycarbonate within the block copolymer thereby providing block copolycarbonate of higher molecular weight that have been found to exhibit single values of $T_g$. Further, by eliminating the step of isolating the polyetherimide or polyimide block the amount of process equipment required to complete the reaction is reduced.

The present invention obviates the step of isolating a hydroxy terminated polyetherimide or polyimide block prior to copolymerization with a dihydroxy composition. However, in accordance with the present invention the polyetherimide or polyimide block may be isolated and then copolymerized with polycarbonate using an activated carbonate as the carbonate source.

An embodiment of the present invention provides a method of forming a block copolycarbonate wherein the method comprises the steps of, (i) forming a first reaction mixture comprising a hydroxy terminated polyetherimide oligomer block or a polyimide oligomer block, (ii) adding to the first reaction mixture an activated carbonate and a dihydroxy composition, thereby forming a second reaction mixture, and (iii) allowing the second reaction mixture to react, thereby forming a block copolycarbonate.

Generally speaking a block copolymer prepared by the method of the present invention comprises a residue from an activated diaryl carbonate. Thus the invention provides a block copolymer comprising:

(i) residues from a hydroxy terminated polyetherimide or polyimide, (ii) residues from a dihydroxy compound different than (i), and (iii) residues from an activated carbonate.

It is preferred that the copolymer of the present invention exhibit a single $T_g$.

The Hydroxy Terminated Polyetherimide Oligomer Block:

The method of preparing the hydroxy terminated polyimide or polyetherimide blocks used in the method of the present invention is not particularly limited. U.S. Pat. Nos. 4,657,977 and 4,611,048 disclose a method of preparing the aforementioned blocks and are incorporated herein by reference. The hydroxy terminated polyetherimide blocks can be prepared by a process comprising reacting a bis ether anhydride of the formula:

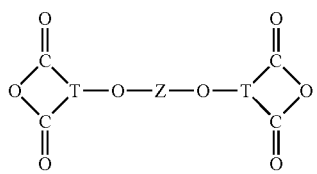

wherein T and Z are as defined above, with a diamine of the formula:

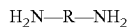

wherein R is as defined above, and an aminoalcohol of the formula:

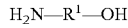

wherein $R^1$ is as defined above; the mole ratio of said bis ether anhydride to said diamine to said aminoalcohol being in the range of from about 0.4–0.5:0.2–0.423:0.4–0.077.

In preferred features of this aspect, the mole ratio of said bis ether anhydride to said diamine to said aminoalcohol is 1+b:b:2 where b is an integer of about 2 to about 12.

The bis ether anhydrides used to prepare the polyetherimides are known or can be readily prepared by those skilled in this art. See, for example, Heath, et al., U.S. Pat. No. 3,847,867. In general, the disodium salt of a dihydric phenol is reacted with a nitroarylimide under condition wherein the C—O—C bonds are formed to give bisimides which are converted to bisanhydrides.

Aromatic bis(ether anhydride)s include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4,(3,4-dicarboxyphenoxy)diphenyl-2,2-propane dianhydride; etc. and mixtures of such dianhydrides.

Suitable organic diamines include, for example, m-phenylenediamine, p-phenylenediamine, 4,4'-diaminodiphenylpropane, 4,4'-diaminodiphenylmethane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(beta-amino-t-butyl)toluene, bis(p-beta-amino-t-butylphenyl) ether, bis(p-beta-methyl-o-aminopentyl)benzene, 1,3-diamino-4-isopropylbenzene, 1,2-bis(3-aminopropoxy) ethane, m-xylylenediamine, p-xylyenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylopropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc.

Suitable aromatic aminoalcohols can vary widely in type. In general, there can be used p-aminophenol, m-aminophenol, 4-hydroxy-4'-aminodiphenoylpropane, 4-hydroxy-4'-aminodiphenyl methane, aminohydroxydiphenylsulfone, 4-hydroxy-4'-aminodiphenyl ether, 2-hydroxy-4-aminotoluene, and illustratively any analogs of those given for the diamines above.

In general, the reactions can be advantageously carried out employing well-known solvents, e.g., o-dichlorobenzene, m-cresol/toluene, etc. in which to effect interaction between the dianhydrides and the diamines, at temperatures of from about 100° C. to about 250° C. Alternatively, the polyetherimides can be prepared by melt polymerization of any of the above dianhydrides with any of the above diamino compounds while heating the mixture of the ingredients at elevated temperatures with concurrent intermixing. Generally, melt polymerization temperatures between about 200° C. to 400° C. and preferably 230° C. to 300° C. can be employed. The conditions of the reaction and the proportions of ingredients can be varied widely depending on the desired molecular weight, intrinsic viscosity, and solvent resistance. In preferred features of this aspect, the mole ratio of said bis ether anhydride to said diamine to said aminoalcohol is 1+b:b:2 where b is an integer of about 2 to about 12. The mole ratio of diamine to aminoalcohol can vary, but usually is in the range of 33%–83 mole % of diamine to 67%–17% aminoalcohol. Preferred mole ratios are 0.4–0.5 bisether anhydride to 0.2–0.423 diamine to 0.4–0.077 aminoalcohol. Generally, useful hydroxy terminated polyetherimide oligomers have an intrinsic viscosity greater than 0.05 deciliters per gram, preferably 0.15 to 0.30, deciliters per gram when measured in chloroform at 25° C. Other methods of making polyetherimide blocks are contemplated and do not depart from the scope of the present invention.

The Activated Carbonate:

The activated carbonate is preferably derived from an activated diaryl dicarbonate or a mixture of an activated diaryl carbonate and diphenyl carbonate. A preferred activated diaryl carbonate of the present invention is an activated diaryl carbonate such as bismethylsalicylcarbonate (BMSC). However, as used herein the term "activated diaryl carbonate" is defined as a diarylcarbonate which is more reactive than diphenylcarbonate toward transesterification reactions. Such activated carbonates are of the general formula:

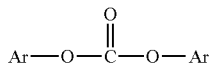

wherein Ar is a substituted aromatic radical having 6 to 30 carbon atoms. The preferred activated carbonates have the more specific general formula:

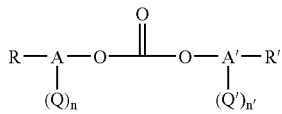

wherein Q and Q' are each independently activating groups. A and A' are each independently aromatic rings which can be the same or different depending on the number and location of their substituent groups, and n or n' are whole numbers of zero up to a maximum equivalent to the number of replaceable hydrogen groups substituted on the aromatic rings A and A', wherein n+n' is greater than or equal to 1. R and R' are each independently substituent groups such as alkyl, substituted alkyl, cycloalkyl, alkoxy, aryl, alkylaryl, cyano, nitro, halogen, and carboalkoxy. The number of R groups is a whole number and can be 0 up to a maximum equivalent to the number of replaceable hydrogen groups on the aromatic rings A minus the number n. The number of R' groups is a whole number and can be 0 up to a maximum equivalent to the number of replaceable hydrogen groups on the aromatic rings A minus the number n'. The number, type, and location of the R and R' substituents on the aromatic ring are not limited unless they deactivate the carbonate and lead to a carbonate which is less reactive than diphenylcarbonate.

Non-limiting examples of activating groups Q and Q' are: alkoxycarbonyl groups, halogens, nitro groups, amide groups, sulfone groups, sulfoxide groups, or imine groups with structures indicated below:

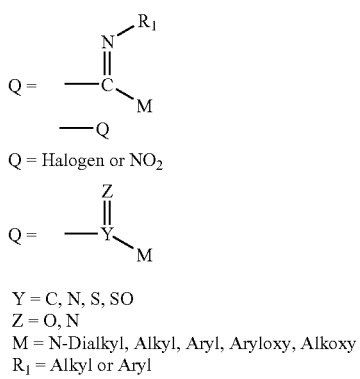

Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures, where the substitution number and type on A and A' are different, are also possible to employ in the current invention. A preferred structure for an activated carbonate is an ester-substituted diarylcarbonate having the structure:

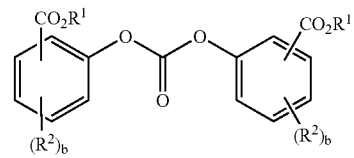

wherein $R^1$ is independently at each occurrence a $C_1$–$C_{20}$ alkyl radical, $C_4$–$C_{20}$ cycloalkyl radical, or $C_4$–$C_{20}$ aromatic radical; $R^2$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4. At least one of the substituents $CO_2R^1$ is preferably attached in an ortho position relative to the carbonate group.

Examples of preferred ester-substituted diarylcarbonates include but are not limited to bis(methylsalicyl)carbonate (CAS Registry No. 82091-12-1), bis(ethyl salicyl)carbonate, bis(propyl salicyl)carbonate, bis(butylsalicyl)carbonate, bis(benzyl salicyl)carbonate, bis(methyl 4-chlorosalicyl)carbonate and the like. Typically BMSC is preferred for use in melt polycarbonate synthesis due to its lower molecular weight and higher vapor pressure.

One method for determining whether a certain diarylcarbonate is activated or is not activated is to carry out a model transesterification reaction between the certain diarylcarbonate with a phenol such as p-(1,1,3,3-tetramethyl)butylphenol. This phenol is preferred because it possesses only one reactive site, possesses a low of volatility and possesses a similar reactivity to bisphenol-A. The model transesterification reaction was carried out at temperatures above the melting points of the certain diarylcarbonate and p-(1,1,3,3-tetramethyl)butylphenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant was determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ an activated carbonate with very high reactivity compared to diphenylcarbonate when conducting transesterification reactions. Preferred are activated carbonates with an equilibrium constant greater than at least 10 times that of diarylcarbonate.

Some non-limiting examples of non-activating groups which, when present in an ortho position relative to the carbonate group, would not be expected to result in activated carbonates are alkyl, cycolalkyl or cyano groups. Some specific and non-limiting examples of non-activated carbonates are bis(o-methylphenyl)carbonate, bis(p-cumylphenyl) carbonate, bis(p-(1,1,3,3-tetramethyl)butylphenyl)carbonate and bis(o-cyanophenyl)carbonate. Unsymmetrical combinations of these structures are also expected to result in non-activated carbonates.

Unsymmetrical diarylcarbonates wherein one aryl group is activated and one aryl is unactivated or de-activated would also be useful in this invention if the activating group renders the diaryl carbonate still more reactive than diphenyl carbonate.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

The theoretical stoichiometry of the reaction within the equilibration vessel requires a molar ratio of dihydroxy compound to diaryl carbonate composition of 1:1. However, in practicing the present invention the molar ratio in the equilibration vessel is suitably between 0.25:1 to 3:1, more preferably 1:0.95 to 1:1.05 and more preferably 1:0.98 to 1:1.02.

The Dihydroxy:

As described above, the dihydroxy compound of the present invention is not particularly limited. The dihydroxy compound is selected such that it is different from the polyimide or polyetherimide block it is copolymerized with.

The Catalyst:

A typical catalyst system used in accordance with the method of the present invention comprises a base, and preferably comprises at least one source of alkaline earth ions or alkali metal ions, and/or at least one quaternary ammonium compound, a quaternary phosphonium compound or a mixture thereof. The source of alkaline earth ions or alkali metal ions being used in an amount such that the amount of alkaline earth or alkali metal ions present in the reaction mixture is in a range between $10^{-5}$ and $10^{-8}$ moles alkaline earth or alkali metal ion per mole of dihydroxy compound employed.

The quaternary ammonium compound is selected from the group of organic ammonium compounds having structure,

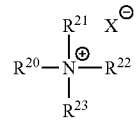

wherein $R^{20}$—$R^{23}$ are independently a $C_1$–$C_{20}$ alkyl radical, $C_4$–$C_{20}$ cycloalkyl radical, or a $C_4$–$C_{20}$ aryl radical; and $X^-$ is an organic or inorganic anion. In one embodiment of the present invention anion $X^-$ is selected from the group consisting of hydroxide, halide, carboxylate, sulfonate, sulfate, formate, carbonate, and bicarbonate.

Non-limiting examples of suitable organic quaternary ammonium compounds are tetramethyl ammonium hydroxide, tetrabutyl ammonium hydroxide, tetramethyl ammonium acetate, tetramethyl ammonium formate and tetrabutyl ammonium acetate. Tetramethyl ammonium hydroxide is often preferred.

The quaternary phosphonium compound is selected from the group of organic phosphonium compounds having structure,

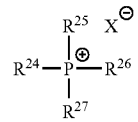

wherein $R^{24}$–$R^{27}$ are independently a $C^1$–$C^{20}$ alkyl radical, $C^4$–$C^{20}$ cycloalkyl radical, or a $C_4$–$C_{20}$ aryl radical; and $X^-$ is an organic or inorganic anion. In one embodiment of the present invention anion $X^-$ is an anion selected from the group consisting of hydroxide, halide, carboxylate, sulfonate, sulfate, formate, carbonate, and bicarbonate. Suitable organic quaternary phosphonium compounds are illustrated by tetramethyl phosphonium hydroxide, tetramethyl phosphonium acetate, tetramethyl phosphonium formate, tetrabutyl phosphonium hydroxide, and tetrabutyl phosphonium acetate (TBPA). TBPA is often preferred.

Where X⁻ is a polyvalent anion such as carbonate or sulfate it is understood that the positive and negative charges in the quaternary ammonium and phosphonium structures are properly balanced. For example, where $R^{20}$–$R^{23}$ are each methyl groups and X⁻ is carbonate, it is understood that X⁻ represents ½ ($CO_3^{-2}$).

Suitable sources of alkaline earth ions include alkaline earth hydroxides such as magnesium hydroxide and calcium hydroxide. Suitable sources of alkali metal ions include the alkali metal hydroxides illustrated by lithium hydroxide, sodium hydroxide and potassium hydroxide. Other sources of alkaline earth and alkali metal ions include salts of carboxylic acids, such as sodium acetate and derivatives of ethylene diamine tetraacetic acid (EDTA) such as EDTA tetrasodium salt, and EDTA magnesium disodium salt. Sodium hydroxide is often preferred.

The amount of catalyst employed is typically based upon the total number of moles of dihydroxy compound employed in the polymerization reaction. When referring to the ratio of catalyst, for example phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of organic ammonium or phosphonium salts employed typically will be in a range between $1\times10^{-2}$ and $1\times10^{-5}$, preferably between $1\times10^{-3}$ and $1\times10^{-4}$ moles per mole of the first and second dihydroxy compounds combined. The inorganic metal hydroxide catalyst typically will be used in an amount corresponding to between $1\times10^{-4}$ and $1\times10^{-8}$, preferably $1\times10^{-4}$ and $1\times10^{-7}$ moles of metal hydroxide per mole of the first and second dihydroxy compounds combined.

In a third catalyst system according to the method of the present invention, solely an alkali metal hydroxide may be employed. As discussed above, alkali metal hydroxides are illustrated by sodium hydroxide, lithium hydroxide, and potassium hydroxide. Due to its relatively low cost, sodium hydroxide is often preferred.

The Process:

The method of the present invention comprises contacting a polyimide or polyetherimide oligomer with a dihydroxy composition under melt polymerization conditions in the presence of an activated diaryl carbonate. A first reaction mixture is prepared comprising the hydroxy terminated polyimide or polyetherimide block. As stated above the first reaction mixture may formed either reacting the components mentioned above and building the desired molecular weight of the polyimide or polyetherimide block, or else the polyimide or polyetherimide block may be preformed and subsequently dissolved in a solvent to produce the first reaction mixture.

An activated carbonate and dihydroxy composition are introduced to the first reaction mixture therein forming a second reaction mixture. The second reaction mixture is maintained under melt polymerization conditions sufficient to couple the free hydroxyl end groups of the polyimide or polyetherimide blocks and the dihydroxy composition to produce a block copolymer.

In an embodiment of the present invention, the resulting block copolycarbonate produced by this method will contain a residue from an activated carbonate in addition to the C=O linkage. This residue will typically be an ester substituted phenol having the structure:

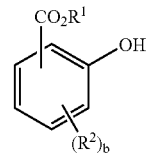

wherein $R^1$ is $C_1$–$C_{20}$ alkyl radical, $C_4$–$C_{20}$ cycloalkyl radical or $C_4$–$C_{20}$ aromatic radical, $R^2$ is independently at each occurrence a hydrogen atom, halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b is an integer 0–4. The ester-substituted phenol is typically any one or combination of methyl salicylate, ethyl salicylate, isopropyl salicylate and benzyl salicylate.

EXAMPLES

Having described the invention in detail, the following examples are provided. The examples should not be considered as limiting the scope of the invention, but merely as illustrative and representative thereof.

In the examples several terms will be referred to and have the following meaning:

MABPA: Mono amino BPA (e.g. 4-NH2, 4'-OH, a.k.a. Isopropylidene diphenol);

BPADA: 2,2-bis[4-2,3-dicarboxyphenoxy pheynyl]propane dianhydrid;

MPD: Metaphenylene diamine;

O-DCB: o-dichloro-benzene;

HQ: Hydroquinone;

BP: 4,4'Biphenol;

PEI: Polyetherimide;

BPAPC: Bisphenol A polycarbonate;

4-AP: 4-Amino phenol;

3-AP: 3-Amino phenol;

BMSC: Bismethylsalicylate; and

BPA: Bisphenol A.

Molecular weights were measured by GPC relative to polystyrene standards.

Examples 1–6

Examples 1–6 demonstrate that block copolycarbonate may be prepared by the process of forming a hydroxy terminated polyetherimide oligomer (Step (1)), isolating it and then copolymerizing it with a dihydroxy compound different than that of the hydroxy terminated polyetherimide oligomer in the presence of an activated diaryl carbonate (Step (II)).

I. Preparation of the Hydroxy Terminated Polyetherimide Oligomer:

(A):

TABLE 1

| Reagents I(A) | |
|---|---|
| BPADA: | 106.284 g (0.2042 mole) |
| MPD | 20.330 g (0.188 mole) |
| MABPA | 3.7051 g (0.0163 mole) |
| o-DCB | 140 ml |

A mixture of BPADA in o-DCB was placed in a 500 ml 3-necked round bottom flask equipped with a mechanical stirrer, and a Dean-Stark trap/condenser with a nitrogen bypass. The mixture was immersed in an oil bath preheated to 165° C. After a clear yellow solution was obtained, melted MPD was added drop wise to the solution and the water formed in the process was co-distilled with o-DCB and collected in the Dean-Stark trap. At the end of the MPD addition, there was approximately 5.8 ml of water collected. The temperature was raised to 175° C. and the distillation continued for 10–15 min. A total of 6.0 ml of water was collected. To the solution was then added ~55 ml of o-DCB and the temperature raised to 200° C. About 50 ml of o-DCB was collected from the Dean-Stark trap in ~10 ml increments to assure that the formation of water has ceased. A heat gun was used to heat the flask above the oil level to assure that no water formed was condensed back in to the reaction solution. Heating was then continued at 200–205° C. for 6 hours, then the oil bath was removed and the reaction mixture was allowed to cool and stand overnight at room temperature under nitrogen.

The reaction solution was then reheated to 170° C. When the reaction mixture reached 170° C. amino-BPA was added. The distillation was restarted in order to remove the water formed. No visible water was collected during the distillation. Approximately 30 ml of o-DCB was added, after ~15 min and the temperature was raised to 200° C. Distillation continued and 30 ml of o-DCB was collected from the Dean-Stark trap in 10 ml increments to assure that all the water formed was removed. Heating was continued for ~6 hours. The viscous solution was diluted with chloroform and the oligomer was obtained by precipitation from heptane with small amount of isopropanol. The results of I(a) are summarized in Table 2.

TABLE 2

| $M_n$ (PS) of oligomer | 11,106 |
|---|---|
| $M_w$ (PS) of oligomer | 23,736 |
| $T_g$ of oligomer (° C.) | 207 |

(B): A lower molecular weight hydroxy terminated Polyetherimide block was prepared using the same procedure as in I(a) with the following change in charge: BPADA—106.284 (g) (0.204) moles, MPD—19.440 (g) (0.180 moles) and Mono amino BPA—7.4109 (g) (0.0326 moles).

TABLE 3

| Reagents I(B) | |
|---|---|
| BPADA: | 106.284 g (0.2024 mole) |
| MPD | 19.440 g (0.180 mole) |
| MABPA | 7.4109 g (0.0326 mole) |
| o-DCB | 140 ml |

The results of I(B) are summarized in table 8.

TABLE 4

| $M_n$ (PS) of oligomer | 8,238 |
|---|---|
| $M_w$ (PS) of oligomer | 14,551 |
| $T_g$ of oligomer (° C.) | 198 |

II. Copolymerization with Another Dihydroxy Composition:

Examples 1–6 demonstrate that block copolycarbonate is obtained by copolymerizing one of the above prepared hydroxy terminated polyetherimide oligomers and a dihydroxy composition in the presence of an activated diaryl carbonate (e.g. BMSC).

Example 1

70% Polyetherimide—30% BPAPC Copolymer

A mixture of 19.2637 (g) of BPA, 50 (g) of hydroxy terminated PEI oligomer from I(A), and 29.3368 (g) of BMSC were placed in a 500 ml 3 necked round bottom flask equipped with a mechanical stirrer, a distillation adapter and a temperature probe. To the mixture were added 90 ul of $1\times10^{-3}$ M aqueous solution of NaOH and 18 ul of 1.26 M aqueous solution of TBPA (Tetra butyl phosphonium acetate). The mixture was heated in an oil bath @ 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 93.6 (g) of isolated PEI-BPAPC oligomer was recovered.

45.35 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (11.0 (g)). The reaction mixture turned to a very viscous clear fluid material. At the end of the reaction, the vacuum was terminated and the system was flushed with nitrogen. The reaction tube was removed from the system and the blade was removed. The copolymer was obtained by pulling off from the blade.

The PEI block copolymer was clear and had a single $T_g$ of 185° C., a $M_w$ (PS) 43,911, and an $M_n$ (PS) 15,796.

Example 2

30% Polyetherimide—70% BPAPC Copolymer

A mixture of 23.330 (g) of BPA, 10.002 (g) of hydroxy terminated PEI oligomer from I(A), and 34.635 (g) of BMSC were placed in a 500 ml 3 necked round bottom flask equipped with a mechanical stirrer, a distillation adapter and a temperature probe. To the mixture were added 103 ul of $1\times10^{-3}$ M aqueous solution of NaOH and 20 ul of 1.26 M aqueous solution of TBPA (Tetra butyl phosphonium Acetate). The mixture was heated in an oil bath @ 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 38.18 (g) of isolated PEI-BPAPC oligomer was recovered.

37.24 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (8.6 (g)). At the end of the reaction, the vacuum was terminated and the system was flushed with nitrogen. The reaction tube was removed from the system and the blade was removed. The copolymer was obtained by pulling off from the blade.

The PEI block copolymer was opaque and had two $T_g$ values of 158° C. and 210° C., a $M_w$ (PS) 59,873, and a $M_n$ (PS) 19,898.

Example 3

50% Polyetherimide—50% BPAPC Copolymer

A mixture of 16.184 (g) of BPA, 18.010 (g) of Hydroxy terminated PEI oligomer from I(A), and 24.249 (g) of BMSC were placed in a 500 ml 3 necked round bottom flask equipped with a mechanical stirrer, a distillation adapter and a temperature probe. To the mixture were added 72 ul of 1×10−3 M aqueous solution of NaOH and 13 ul of 1.26 M aqueous solution of TBPA (Tetra butyl phosphonium Acetate). The mixture was heated in an oil bath at 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 53.7 (g) of isolated PEI-BPAPC oligomer was recovered.

45.0 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (16.1 grams). At the end of the reaction, the vacuum was terminated and the system was flushed with nitrogen. The reaction tube was removed from the system and the blade was removed. The copolymer was obtained by pulling off from the blade.

The PEI block copolymer was opaque and had two $T_g$ values of 160° C. and 198° C., a $M_w$ (PS) 99,541, and a $M_n$ (PS) 32,241.

Example 4

30% Polyetherimide-70% BPAPC Copolymer

A mixture of 34.161 (g) of BPA, 15.0057 (g) of Hydroxy terminated PEI oligomer from I(B), and 47.0048 grams of BMSC were placed in a 500 ml 3 necked round bottom flask equipped with a mechanical stirrer, a distillation adapter and a temperature probe. To the mixture were added 281 ul of 1×10-3 M aqueous solution of NaOH and 35 ul of 1.00 M aqueous solution of TMAH (Tetra methyl ammonium hydroxide). The mixture was heated in an oil bath at 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 82.8 grams of isolated PEI-BPAPC oligomer was recovered.

45.0 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (19.8 (g)). At the end of the reaction, the vacuum was terminated and the system was flushed with nitrogen. The reaction tube was removed from the system and the blade was removed. The copolymer was obtained by pulling off from the blade.

The PEI block copolymer was clear and had a single $T_g$ of 165° C., a $M_w$ (PS) 91,893, and a $M_n$ (PS) 22,449.

Example 5

70% Polyetherimide—30% BPAPC Copolymer

A mixture of 15.4114 (g) of BPA, 40.002 (g) of hydroxy terminated PEI oligomer from I(B), and 24.2508 (g) of BMSC were placed in a 500 ml 3 necked round bottom flask equipped with a mechanical stirrer, a distillation adapter and a temperature probe. To the mixture were added 152 ul of 1×10−3 M aqueous solution of NaOH and 19 ul of 1.00 M aqueous solution of TMAH (Tetra methyl ammonium hydroxide). The mixture was heated in an oil bath at 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 60.34 (g) of isolated PEI-BPAPC oligomer was recovered.

48.16 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (11.8 (g)). At the end of the reaction, the vacuum was terminated and the system was flushed with nitrogen. The reaction tube was removed from the system and the blade was removed. The copolymer was obtained by pulling off from the blade.

The PEI block copolymer was clear and had a single $T_g$ of 190° C., a $M_w$ (PS) 60,364, and a Mn (PS) 23,292.

Example 6

50% Polyetherimide—50% BPAPC Copolymer

A mixture of 26.9639 (g) of BPA (0.1180 moles), 30.006 (g) of Hydroxy terminated Polyetherimide oligomer from I(b), and 40.9266 (g) (0.1239 moles) of BMSC were placed in a 500 ml 3 necked round bottom flask equipped with a mechanical stirrer, a distillation adapter and a temperature probe. To the mixture were added 125 ul of $1\times10^{-3}$ M aqueous solution of NaOH and 25 ul of 1.26 M aqueous solution of TBPA (Tetra butyl phosphonium acetate). The mixture was heated in an oil bath at 200° C. A thick suspension paste was obtained at the beginning and as the reaction proceed, the mixture become a viscous, clear yellow fluid. After about 4 hours, the homogeneous, viscous mixture was poured out as much as possible into an aluminum foil lined tray. The rest of the material in the flask was removed by solidification with liquid nitrogen. A total of 90.06 (g) of isolated Polyetherimide-BPAPC oligomer was recovered.

45.1 (g) of the above oligomer was placed in a cylindrical reaction tube. The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached, while the temperature was gradually raised to 310° C. During this process, methyl salicylate was distilled and collected in a receiving tube (15.6 (g)). At the end of the reaction, the vacuum was terminated and the system was flushed with nitrogen. The reaction tube was removed from the system and the blade was removed. The copolymer was obtained by pulling off from the blade.

The PEI block copolymer was clear and had a single $T_g$ of 178, a $M_w$ (PS) 55,981, and a $M_n$ (PS) 18,623.

Examples 7–10

Examples 7–10 demonstrate that PEI block copolymers may be prepared by copolymerizing PEI oligomers with a dihydroxy compound in the presence of an activated carbonate without the intermediate step of isolating the PEI oligomers.

Example 7

70% Polyetherimide—30% BPAPC Copolymer

TABLE 5

| Example 7 Reagents | |
| --- | --- |
| BPADA: | 106.284 g (0.2042 mole) |
| MPD | 20.330 g (0.188 mole) |
| MABPA | 3.7051 g (0.0163 mole) |

TABLE 5-continued

| Example 7 Reagents | |
| --- | --- |
| o-DCB | 140 ml |
| BPA | 47.4785 g (0.2078 mole) |
| BMSC | 72.2881 g (0.2188 mole) |
| NaOH | 207 ul (1 × 10$^{-3}$ M) |
| TBPA | 41 ul (1.26 M) |

A mixture of BPADA in o-DCB was placed in a 500 ml 3-necked round bottom flask equipped with a mechanical stirrer, and a Dean-Stark trap/condenser with a nitrogen bypass. The mixture was immersed in an oil bath preheated to 165° C. After a clear yellow solution was obtained, melted MPD was added drop wise to the solution and the water formed in the process was co-distilled with O-DCB and collected in the Dean-Stark trap. At the end of the MPD addition, there was approximately 5.8 ml of water collected. The temperature was raised to 175° C. and the distillation continued for 10–15 min. A total of 6.0 ml of water were collected. To the solution was then added ~55 ml of o-DCB and the temperature raised to 200° C. About 50 ml of o-DCB were collected from the Dean-Stark trap in ~10 ml increments to assure that the formation of water has ceased. A heat gun was use to heat the flask above the oil level to assure that no water formed was condensed back in to the reaction solution. Heating was then continued at 200–205° C. for 6 hours then the oil bath was removed and the reaction mixture was allowed to cool and stand overnight at room temperature under nitrogen.

The reaction solution was then reheated to 170° C. and the mono amino-BPA added. Distillation took place again to remove the water formed. No visible water was collected during the distillation. Approximately 30 ml of o-DCB was added after ~15 min and the temperature increased to 200° C. Distillation continued and 30 ml of o-DCB was collected from the Dean-Stark trap in 10 ml increments, to assure that all the water formed was removed. Heating was continued for ~6 hours when the oil bath was removed and the mixture allowed to stand overnight at room temperature under nitrogen.

The reaction solution was heated to 200° C. and to the solution was added the BPA, BMSC and the catalysts NaOH and TBPA. The mixture was stirred for 3.0 hours at which time the reaction was terminated and the solution poured into 3 reaction tubes (~90 ml each). The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached while the temperature was also gradually raised to 310° C. During this process, methyl salicylate and o-DCB were distilled and collected in a receiving tube (54.6 (g)). The reaction mixture turned to a very viscous clear fluid material. At the end of the reaction, the vacuum was terminated and the system was flushed with nitrogen. The reaction tube was removed from the system. The copolymer was obtained by pulling off from the blade.

An amorphous, tough, clear PEI block copolymer (after cooling) was obtained having a single $T_g$ of 182° C., a $M_w$ (PS) 62,812, and a $M_n$ (PS) 22,881.

Example 8

Example 7 was repeated except that the MABPA was replaced with an equivalent molar amount of 4-AP (1.7791 (g), 0.0163 moles).

An amorphous, tough, clear PEI block copolymer (after cooling) was obtained having a single $T_g$ of 201° C., a $M_w$ (PS) 75,326, and a $M_n$ (PS) 20,210.

Example 9

Example 7 was repeated except that the MABPA was replaced with an equivalent molar amount of 3-AP (1.7785 (g), 0.0163 moles).

An amorphous, tough, clear PEI block copolymer (after cooling) was obtained having a single $T_g$ of 193° C., a $M_w$ (PS) 62,752, $M_n$ (PS) 21,035.

Example 10

80% Polyetherimide—20% BPAPC Copolymer

TABLE 6

Example 10 Reagents

| | |
|---|---|
| BPADA: | 106.284 g (0.2042 mole) |
| MPD | 20.330 g (0.188 mole) |
| MABPA | 3.7051 g (0.0163 mole) |
| o-DCB | 140 ml |
| BPA | 27.6980 g (0.1213 mole) |
| BMSC | 43.1190 g (0.1305 mole) |
| NaOH | 135 ul (1 × 10⁻³ M) |
| TBPA | 27 ul (1.26 M) |

A mixture of BPADA in o-DCB was placed in a 500 ml 3-necked round bottom flask equipped with a mechanical stirrer, and a Dean-Stark trap/condenser with a nitrogen bypass. The mixture was immersed in an oil bath preheated to 165° C. After a clear yellow solution was obtained, melted MPD was added drop wise to the solution and the water formed in the process was co-distilled with o-DCB and collected in the Dean-Stark trap. At the end of the MPD addition, there was approximately 5.8 ml of water collected. The temperature was raised to 175° C. and the distillation continued for 10–15 min. A total of 6.0 ml of water were collected. To the solution was then added ~55 ml of o-DCB and the temperature raised to 200° C. About 50 ml of o-DCB were collected from the Dean-Stark trap in ~10 ml increments to assure that the formation of water has ceased. A heat gun was use to heat the flask above the oil level to assure that no water formed was condensed back in to the reaction solution. Heating was then continued at 200–205° C. for 6 hours then the oil bath was removed and the reaction mixture was allowed to cool and stand overnight at room temperature under nitrogen.

The reaction solution was then reheated to 170° C. and the MABPA added. Distillation took place again to remove the water formed. No visible water was collected during the distillation. Approximately 30 ml of o-DCB was added after ~15 min and the temperature increased to 200° C. Distillation continued and 30 ml of o-DCB was collected from the Dean-Stark trap in 10 ml increments, to assure that all the water formed was removed. Heating was continued for ~6 hours when the oil bath was removed and the mixture allowed to stand overnight at room temperature under nitrogen.

The reaction solution was heated to 200° C. and to the solution was added the BPA, BMSC and the catalysts NaOH and TBPA. The mixture was stirred for 3.0 hours at which time the reaction was terminated and the solution poured into 3 reaction tubes (~90 ml each). The tube was connected to a reaction system equipped with a condensing system, vacuum source and a stainless steel agitator and constant speed drive motor. The reaction system was blanketed with nitrogen. The solid was heated with an electrically heated aluminum block and the temperature set to 220° C. After the oligomer began to melt, the stirrer was started at a lower speed and the vacuum initiated, the pressure was slowly dropped until full vacuum was reached while the temperature was also gradually raised to 310° C. During this process, methyl salicylate and o-DCB were distilled and collected in a receiving tube (56.0 (g)). The reaction mixture turned to a very viscous clear fluid material. At the end of the reaction, the vacuum was terminated and the system was flushed with nitrogen. The reaction tube was removed from the system. The copolymer was obtained by pulling off from the blade.

An amorphous, tough clear PEI block copolymer (after cooling) was obtained have a single $T_g$ 204, a $M_w$ (PS) 64,673, and a $M_n$ (PS) 22,483.

The invention claimed is:

1. A block copolymer comprising blocks of:
   (i) polyetherimide or polyimide, the block having an average $M_n$ of at least 7,000, and
   (ii) polycarbonate,
   wherein the weight ratio of blocks (i) to the block copolymer is between 0.10 and 0.90.

2. The block copolymer of claim 1, wherein the weight ratio of blocks (i) to the block copolycarbonate is between 0.20 to 0.80.

3. The block copolymer of claim 1, wherein the block copolymer has a single $T_g$.

4. The block copolymer of claim 3, wherein the $T_g$ is at least 130° C.

5. The block copolymer of claim 4, wherein the $T_g$ is at least 150° C.

6. A method of forming a block copolycarbonate wherein the method comprises the steps of,
   (i) forming a first reaction mixture comprising a hydroxy terminated polyetherimide oligomer blocks or polyimide oligomer blocks,
   (ii) adding to the first reaction mixture an activated carbonate and a dihydroxy composition, thereby forming a second reaction mixture, and
   (iii) allowing the second reaction mixture to react, thereby forming a block copolycarbonate.

7. The method of claim 6, wherein the weight ratio of the blocks in step (i) to the block copolymer is from 0.20 to 0.80.

8. The method of claim 6, wherein the block copolymer has a single $T_g$.

9. The method of claim 8, wherein the $T_g$ is at least 130° C.

10. The method of claim 9, wherein the $T_g$ is at least 150° C.

11. The method of claim 6 wherein step (ii) further comprises adding a catalyst wherein the catalyst comprises a mixture of an alkali metal hydroxide and an organic catalyst.

12. The method of claim 11, wherein the alkali metal hydroxide is sodium hydroxide and the organic catalyst is tetramethyl ammonium hydroxide (TMAH).

13. The method of claim 6, wherein the blocks in step (i) are hydroxy terminated polyetherimide blocks, and wherein the first reaction mixture is formed by the method comprising the steps of:
(i) preparing a mixture comprising bis ether anhydride, diamine, aminoalcohol and solvent, and
(ii) allowing the mixture to react thereby forming a second reaction mixture wherein during the reaction hydroxy terminated polyetherimide blocks are built with an average $M_n$ of at least 7,000,
thereby forming the first reaction mixture.

14. A block copolymer comprising:
(i) residues from a hydroxy terminated polyetherimide or polyimide,
(ii) residues from a dihydroxy compound different than (i), and
(iii) residues from an activated carbonate.

15. The block copolymer of claim 14, wherein the block copolymer has a single $T_g$.

16. The block copolymer of claim 15, wherein the $T_g$ is at least 130° C.

17. The block copolymer of claim 16, wherein the $T_g$ is at least 150° C.

18. The block copolymer of claim 14, wherein the residues from an activated carbonate comprises an ester substituted phenol.

19. The block copolymer of claim 18, wherein the residue from an activated carbonate comprises methyl salicylate.

20. A block copolymer consisting essentially of blocks of:
(i) polyetherimide or polyimide, the block having an average $M_n$ of at least 7,000, and
(ii) polycarbonate,
wherein the weight ratio of blocks (i) to the block copolymer is between 0.10 and 0.90.

21. The block copolymer of claim 20, wherein the weight ratio of blocks (i) to the block copolycarbonate is between 0.20 to 0.80.

22. The block copolymer of claim 20, wherein the block copolymer has a single $T_g$.

23. The block copolymer of claim 22, wherein the $T_g$ is at least 130° C.

24. The block copolymer of claim 23, wherein the $T_g$ is at least 150° C.

* * * * *